United States Patent

Hucker

[11] 4,052,658
[45] Oct. 4, 1977

[54] INVERTER CIRCUIT FOR PRODUCING SYNTHESIZED SINUSOIDAL WAVEFORMS

[75] Inventor: David J. Hucker, Rockford, Ill.

[73] Assignee: Sundstrand Corporation, Rockford, Ill.

[21] Appl. No.: 733,106

[22] Filed: Oct. 18, 1976

[51] Int. Cl.² .................................................. H02M 1/12
[52] U.S. Cl. .................................. 363/43; 328/165; 363/72
[58] Field of Search ............... 321/9 R, 27 R, 27 MS, 321/DIG. 1; 328/158, 165

[56] References Cited

U.S. PATENT DOCUMENTS

| 3,340,469 | 9/1967 | Catherall et al. | 321/DIG. 1 |
| 3,573,602 | 4/1971 | Jensen | 321/27 R |
| 3,579,081 | 5/1971 | Bates | 321/27 X |
| 3,767,996 | 10/1973 | Bates | 321/DIG. 1 X |
| 3,838,331 | 9/1974 | Jensen | 321/DIG. 1 X |

Primary Examiner—William M. Shoop
Attorney, Agent, or Firm—Wegner, Stellman, McCord, Wiles & Wood

[57] ABSTRACT

An inverter circuit which provides a synthesized sinusoidal output waveform having a low harmonic content. The inverter is light in weight, highly efficient and driven by a fundamental rectangular component having a frequency equal to the desired synthesized sinusoidal output frequency. Single-phase or three-phase output is provided.

12 Claims, 15 Drawing Figures

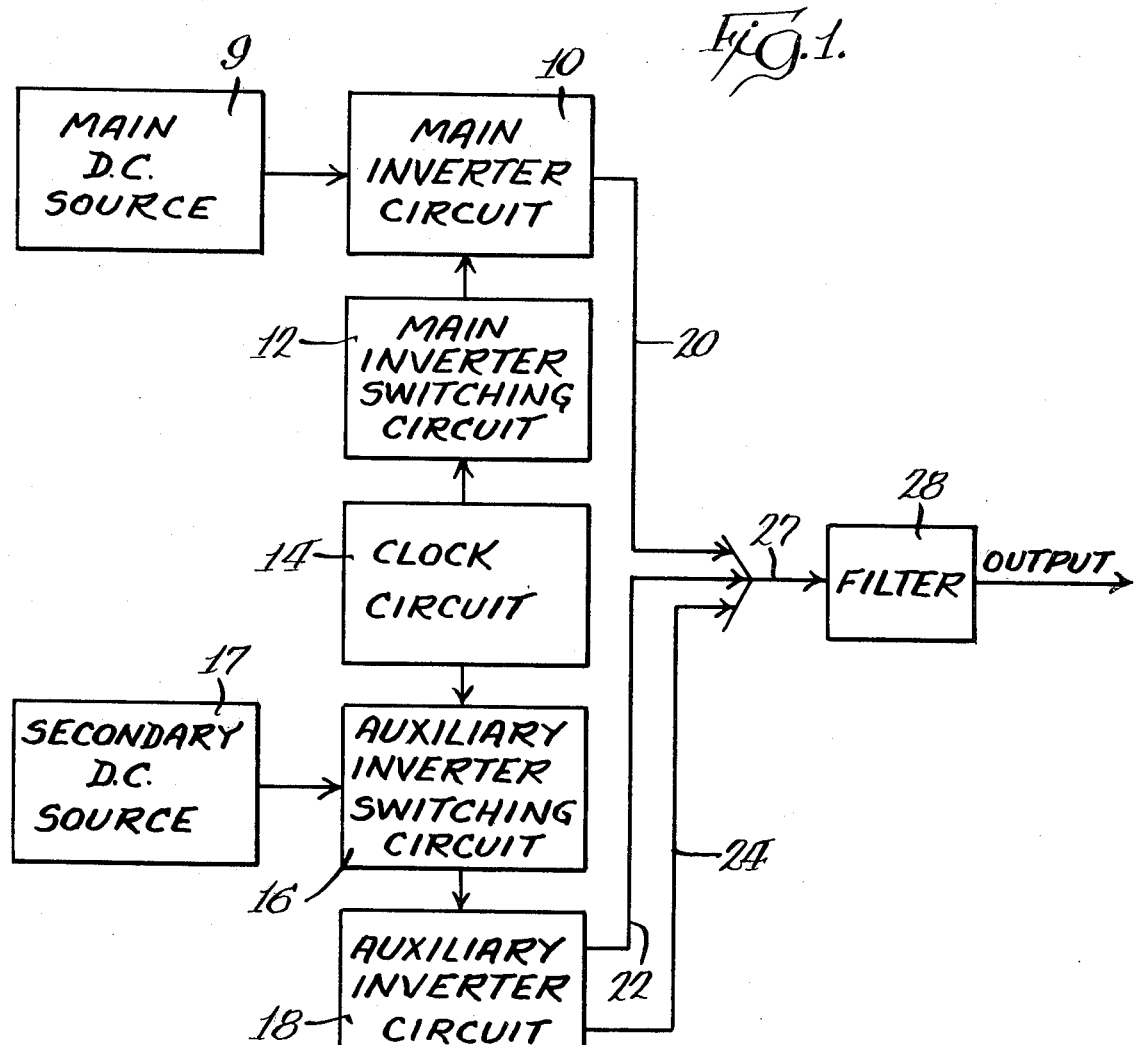

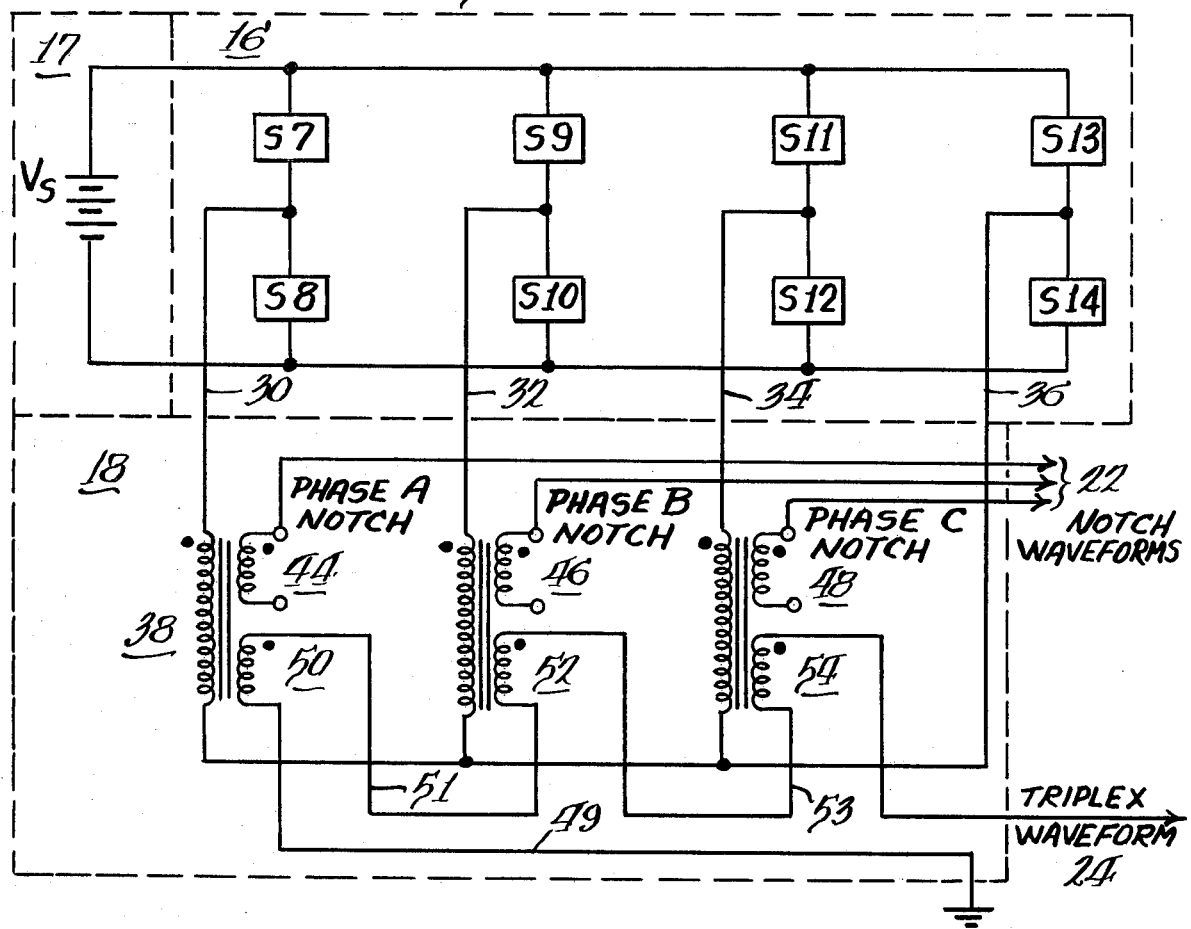

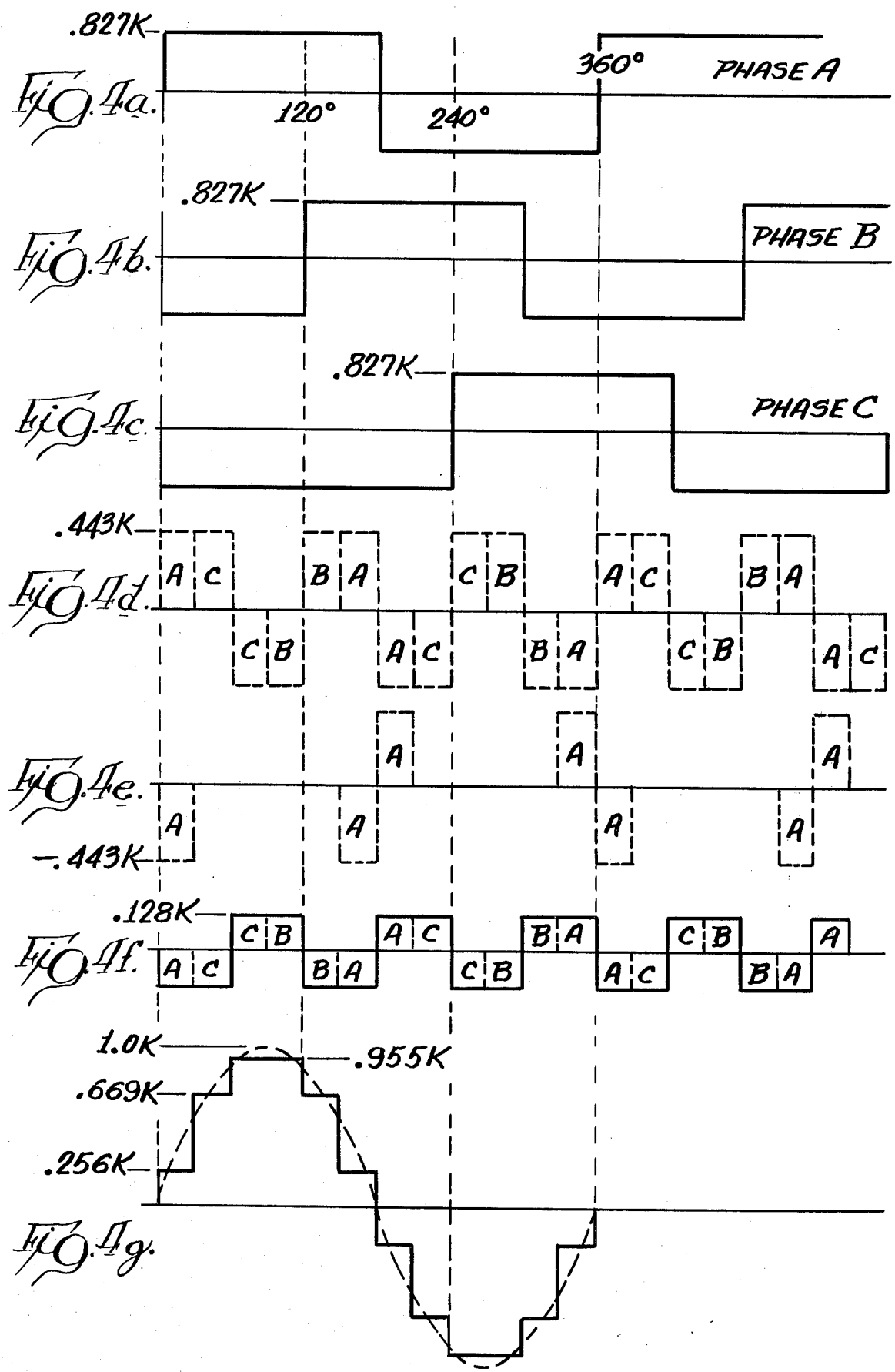

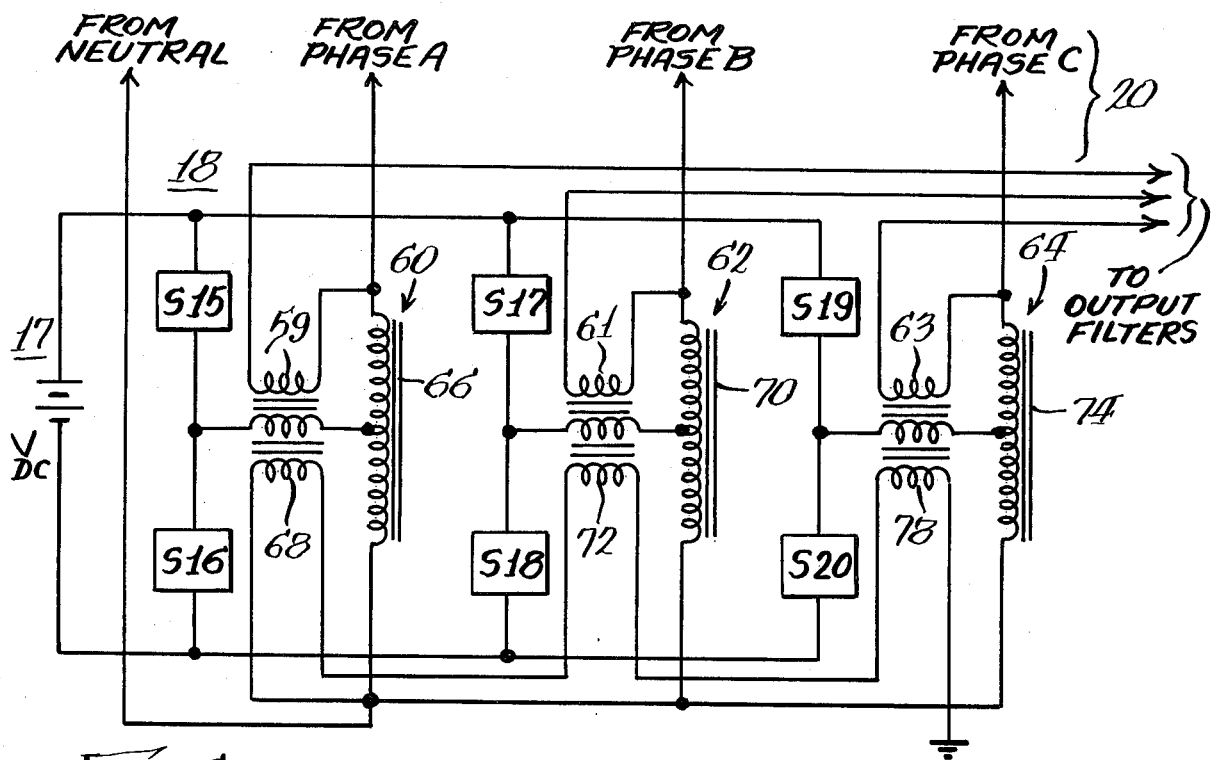
Fig. 6a.
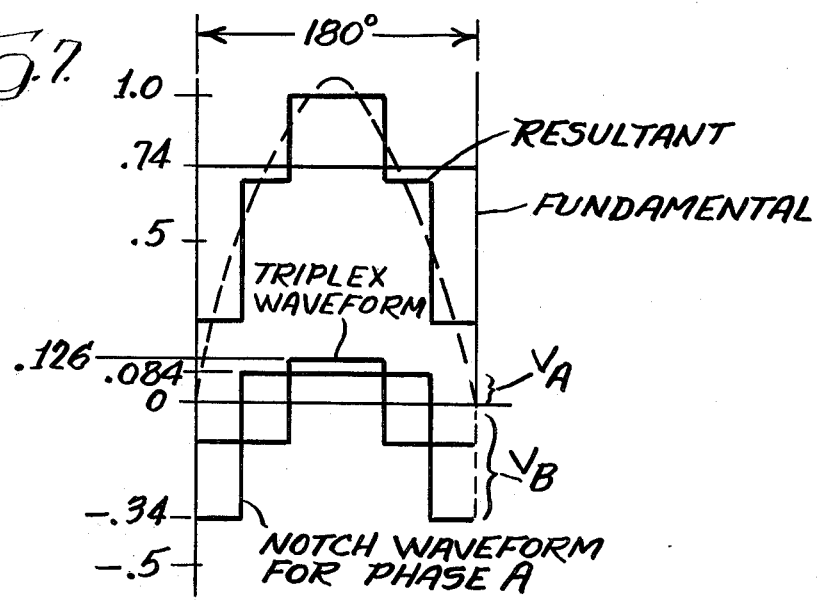
Fig. 6b.
Fig. 7.

INVERTER CIRCUIT FOR PRODUCING SYNTHESIZED SINUSOIDAL WAVEFORMS

RELATED APPLICATIONS

This application is related to copending application Ser. No. 670,539, having a filing date of Mar. 25, 1976, and a common assignee.

BACKGROUND OF THE INVENTION

This invention relates to DC and AC inverters and, more particularly, to a highly efficient circuit which advantageously develops a sinusoidal waveform having a low harmonic content from rectangular or square wave components.

As discussed in the above-referenced copending application, inverters serve the purpose of providing AC power requirements when only DC is available. Inverters are well known and are usually considered to be off-the-shelf items when efficiency, weight and harmonic levels are not a consideration. However, when such considerations become important, one must carefully evaluate the particular inverter.

When evaluating inverters, several features are typically examined. Consideration is given to the total harmonic noise level rejection, the efficiency of the inverter and its total weight. An evaluation of these considerations is most critical where the environment of the inverter is adverse. For example, in aircraft, balloon or space use, it becomes important to obtain an inverter capable of providing power with a low harmonic content so that the noise resulting from the presence of the harmonics will not interfere with other airborne components and systems. Furthermore, good efficiency is a requirement because of the limited DC power available. Finally, the weight associated with the inverter is an important consideration for obvious reasons.

It is difficult to obtain a highly efficient, low harmonic, lightweight inverter, and usually the improvement of one characteristic is accomplished at the expense of one or both of the other two. As shown in the copending application, a sine wave can be approximated by generating a rectangular wave and then combining it with a stepped waveform while advantageously eliminating the first through the eleventh harmonics. The system disclosed in the copending application is desirable because it is light in weight and at the same time it has the capability of minimizing the harmonics.

I have now developed another inverter which eliminates the first through the eleventh harmonics, is even lighter in weight than the inverter disclosed in the copending application, and is driven by a fundamental rectangular component at a frequency equal to the synthesized sinusoidal output frequency for a maximization of the efficiency.

SUMMARY OF THE INVENTION

A main rectangular waveform having a frequency equal to the desired output frequency of the synthesized sinusoidal AC is developed. An auxiliary inverter circuit generates two distinct waveforms to be summed with the main rectangular waveform. The two distinct waveforms generated by the auxiliary circuit include individual "notch" pulses and a square wave having a frequency equal to three times (triplex wave) that of the fundamental main rectangular wave. When the triplex wave, the notched wave and the main rectangular wave are summed, the resulting waveform approximates a sinusoidal waveform virtually free of the first through the eleventh harmonics. The relative amplitudes of the notched wave and the triplex wave are selected to cancel undesirable harmonics in the line-to-neutral output voltages.

A principal object of the present invention is to provide a three-phase inverter circuit which produces a sinusoidal output.

Another object of the invention is to provide a three-phase inverter circuit which produces a sinusoidal output having minimal harmonic content.

Another object of the invention is to provide such a lightweight inverter while maintaining high efficiency.

A further object of the present invention is to provide a three-phase inverter that generates two auxiliary components which, when summed together with a main rectangular wave, provide a synthesized sinusoidal output.

Another object of the invention is to provide an inverter having a main inverter circuit portion which switches the major part of power at the same frequency as the desired synthesized sinusoidal output.

The foregoing objects will be made more apparent and the several features and advantages of the inverter will become more readily apparent when referring to the drawing in which:

BRIEF DESCRIPTION OF THE DRAWING

FIG. 1 is a simplified block diagram of the three-phase inverter;

FIG. 2 is a schematic diagram of the main DC source, the main inverter circuit, and the main inverter switching circuit;

FIG. 3a shows the secondary DC source, the auxiliary inverter switching circuit and the auxiliary inverter circuit;

FIG. 3b depicts the switching sequence of the switches in the auxiliary inverter circuit;

FIG. 4a depicts the fundamental rectangular waveform (phase A) as developed by the main inverter circuit;

FIG. 4b is the fundamental rectangular waveform developed by the main inverter circuit 120° out of phase (phase B) from the waveform shown in FIG. 4a;

FIG. 4c is the fundamental rectangular waveform developed by the main inverter circuit 120° out of phase (phase C) from the waveform shown in FIG. 4b;

FIG. 4d illustrates the notch output of auxiliary inverter circuit for the three phases of the fundamental wave of FIGS. 4a-4c;

FIG. 4e illustrates an inversion of the notch output of the auxiliary circuit for the waveform (phase A) of FIG. 4a;

FIG. 4f depicts the triplex waveform resulting from combining the three phases of notch waveforms;

FIG. 4g is a graphical representation of the sinusoidal output (phase A) having a frequency equal to the fundamental rectangular wave of FIG. 4a;

FIG. 6a is a schematic of another auxiliary inverter circuit;

FIG. 6b depicts the switching sequence of the circuit in 6a; and

FIG. 7 illustrates the waveforms from the circuit in FIG. 6a.

DESCRIPTION OF THE PREFERRED EMBODIMENT

Figure 5:
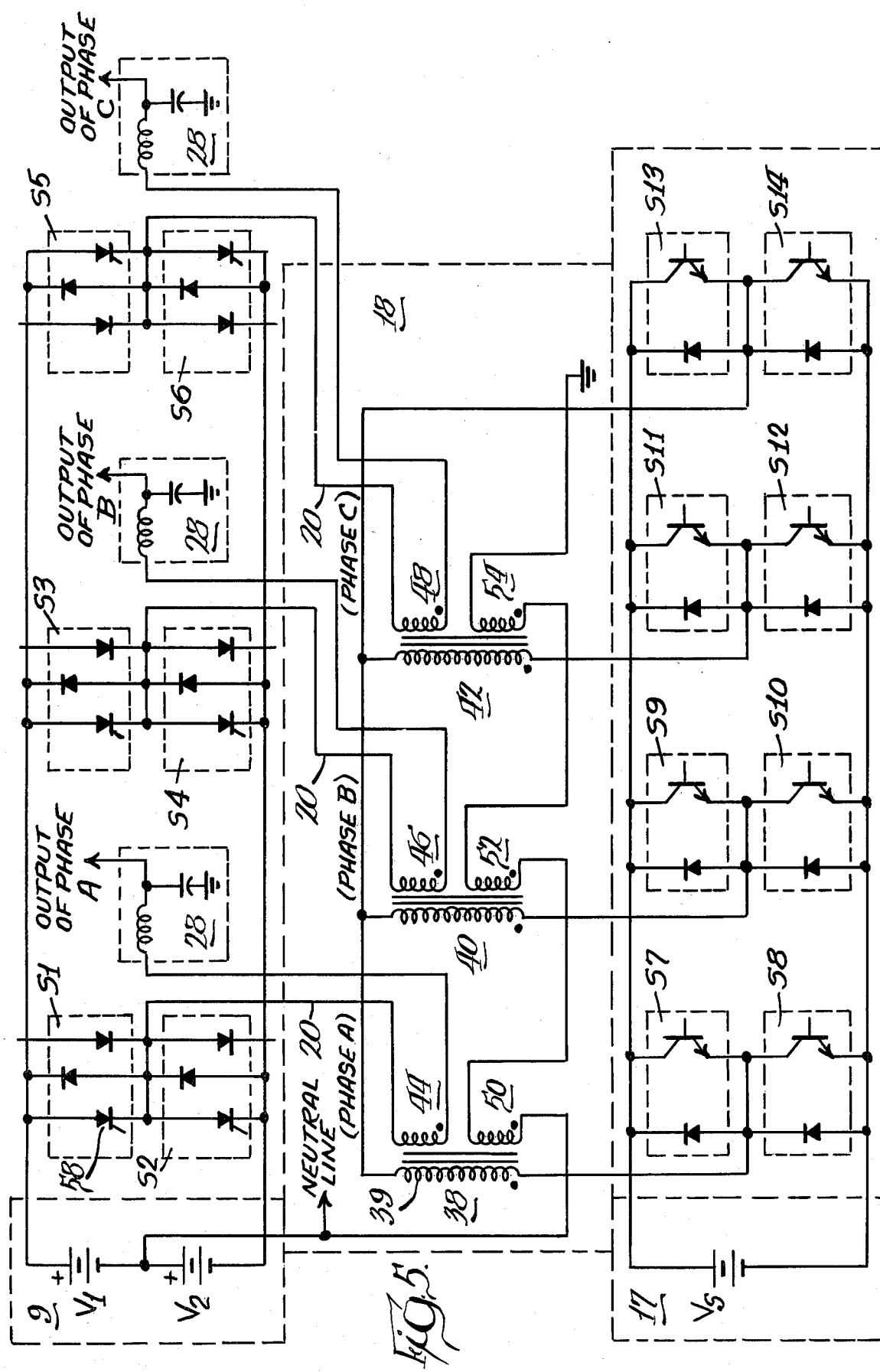
FIG. 5 is a schematic diagram of the entire inverter system.

Referring to FIG. 1, one embodiment of the three-phase DC to AC inverter circuit includes a main inverter circuit 10 supplied by a main DC source 9 and coupled to provide summed waveform 27. The main inverter circuit 10 is switched by main inverter switching circuit 12 which controls the frequency of the three-phase output on line 20 of the main inverter circuit. A clock circuit 14 provides timing control to the main inverter switching circuit 12 for synchronizing it with the operation of auxiliary inverter switching circuit 16. Auxiliary inverter switching circuit 16 is supplied by an auxiliary DC source 17 which may be derived from the main DC source 9. Auxiliary inverter switching circuit 16 switches DC from the source 17 to auxiliary inverter circuit 18. The auxiliary inverter circuit 18 develops two outputs on lines 22 and 24. Line 22 carries the "notch" waveform signal for each of three phases. The notch waveform is a series of four pulses for every period of the main waveform. The position of the four pulses is discussed below. Typically, however, each pulse width is 30° of the main frequency. Line 24 provides the triplex signal (FIG. 4f) for all three phases. The triplex signal is appropriately combined with the notch waveform on line 22 and the main waveform on line 20 to provide the desired synthesized sinusoidal three-phase waveform 27 (FIG. 4g) for phase A. The triplex waveform has a frequency of three times the fundamental frequency and is constructed by combining the notched waveforms of the three phases as they are generated by the auxiliary inverter circuit 18. The waveforms on lines 20, 22 and 24 are combined for the production of all three phases of the synthesized sinusoidal three-phase waveform. Filter 28 is a simple passive filter for smoothing the synthesized waveform.

Referring to FIG. 2, a schematic diagram is provided for main DC source 9, main inverter circuit 10 and main inverter switching circuit 12. Source 9, as illustrated, includes batteries $V_1$ and $V_2$ connected in series with a center lead connected between them to provide a three-phase circuit neutral. Battery $V_1$ provides a positive voltage with respect to circuit ground whereas battery $V_2$ provides a negative voltage with respect to circuit ground. Although batteries $V_1$ and $V_2$ are shown for convenience, source 9 could also provide direct current by the use of a rectified AC source, for example. The characteristics of $V_1$ and $V_2$ are essentially the same, and the voltage of the two batteries depends upon the desired peak value of the sinusoidal AC output. The voltage of $V_1$ and $V_2$ is approximately 83% of the peak value of the filtered synthesized waveform. Main inverter switching circuit 12 has six switches or three pairs: S1-S2, S3-S4 and S5-S6. These switches may be SCR's, heavy duty power transistors, or any other type switching mechanism capable of switching the power from batteries $V_1$ and $V_2$. Each pair of switches provides a rectangular waveform of the fundamental frequency in a 120° phase relationship with the other two phases. FIGS. 4a through 4c best depict the waveforms produced by the three pairs of switches. Clock circuit 14 provides the necessary timing pulses to a ring counter or other similar device (not shown) to effect the appropriate switching action of switching circuit 12 for generating the three fundamental waves. Main inverter circuit 10, as shown in FIG. 2, provides the fundamental waveforms at the selected frequency between the switch pairs for phase A, phase B and phase C. The circuit neutral from the junction of the two batteries $V_1$ and $V_2$ provides a line-to-neutral voltage for all three phases.

Referring to FIG. 3a, auxiliary DC source 17, shown as a battery for convenience, is connected to auxiliary inverter circuit 16 which in turn is coupled to auxiliary inverter circuit 18. Voltage $V_s$ established by source 17 may be less than $V_1$ or $V_2$, but is determined by the selected transformer ratio as discussed below.

Switches S7 through S14, which comprise the auxiliary inverter switching circuit 16, provide the necessary switching for the auxiliary inverter circuit 18. The switches may be transistors, SCR's or the like and are required to provide four pulses per period for each of phase A, phase B and phase C on lines 30, 32 and 34, respectively. Switches S7 through S14 are timed by clock circuit 14 and are switched in a manner depicted by FIG. 3b. FIG. 4d shows the notch pulse waveforms for the three phases A, B and C as they appear on lines 30, 32 and 34, respectively. Line 36 and its associated switches S13 and S14 provide switching for the three phases at each of the transformers 38, 40 and 42, which is apparent by considering FIG. 3a in combination with FIG. 3b. During the time between the pulses, the appropriate switch pair connects both sides of the coil to the same side of the voltage source to assure a zero voltage drop across it. During the period of time that a particular coil is energized, the switching sequence is such, as is apparent from FIG. 3a and FIG. 3b, that one side of the coil is connected to the positive side of the voltage source, the other side of the coil connected to the negative side. Thus, the total voltage across the coil is $V_s$. Coil windings 50, 52 and 54 provide the notch pulses for phases A, B and C, respectively, as shown in FIG. 4e for phase A, by selectively switching opposite ends of the coil 38 to the positive and negative side of battery $V_s$ in a manner described above. The notch voltages on line 22 from the auxiliary inverter switch circuit 18 are available from the coil windings 44, 46 and 48 of transformers 38, 40 and 42, respectively. As illustrated in FIG. 4d, the notch pulses for phase A are inverted when compared to the pulses provided by winding 44. The inversion of the pulses is achieved by the appropriate winding configuration of the auxiliary transformers as indicated by the dot notation of FIG. 3a.

Transformers 38, 40 and 42 also have another winding, 50, 52 and 54, respectively, and they are connected in series to provide the triplex waveform shown in FIG. 4f. Specifically, winding 50 provides pulses similar to that developed by winding 44, and when each of the pulses for phases A, B and C are developed by windings 50, 52 and 54, the triplex waveform, such as that shown in FIG. 4f, is available on line 24. The triplex waveform obtained on line 24 originates from the switching of S7 through S14. This can best be seen in FIG. 4f, which shows the various notches of phases A, B and C, and how they combine to form the triplex waveform ultimately available on line 24. The triplex waveform available on line 24, as shown in FIG. 4f, differs 180° in phase from that shown in FIG. 4d. The phase is changed by the appropriate winding configuration of the transformer as shown by the dot notation in FIG. 3a.

The windings of transformers 38, 40 and 42 are critical because, as discussed in the above-noted copending application, the amplitudes of the various components effect the harmonic content of the desired sinusoidal output. FIG. 4a, FIG. 4e and FIG. 4f depict the individual components of the synthesized sinusoidal wave for phase A, which is shown in FIG. 4g. The relative amplitudes of the individual components shown are selected to cancel the first through the eleventh harmonics. That is to say, if the desired sinusoidal output has an amplitude of K volts, a notch waveform having a value of 0.443 times K will eliminate the fifth and seventh harmonics of the main line-to-neutral if the main fundamental waveform has an amplitude of 0.827 times K. Similarly, the triplex wave will cancel the third harmonic and multiples thereof in the line-to-neutral voltage if the amplitude is selected at 0.128 times the constant K. Thus, it is important that the separate winding of each transformer be wound in the following proportions as typified by transformer 38:

1.0 (winding 39) : 0.128 (winding 50) : 0.443 (winding 44)

FIG. 5 is a schematic of the entire inverter circuit, and the reference numbers used in FIG. 5 correspond to their respective components in FIGS. 1 through 4. Several features illustrated in FIG. 5 have not heretofore been described. For example, S1 shows a main inverter switch having SCR 58 controlled by clock 14 (FIG. 1) and diode 80. The SCR is switched in a manner described previously such as shown in and having a sequence such as that of FIG. 3b. Diode 80 is connected across the SCR and provides a path for regeneration current back to the main DC supply 9. Other similarly placed diodes throughout the switches S1 through S14 provide a similar function. Also, it should be noted that auxiliary switches S7 through S14 are shown as transistors. The base of each transformer is coupled to clock 14.

Other auxiliary inverter circuit configurations and switching circuits may be used to combine a notched waveform, a triplex, and a fundamental to produce a three-phase synthesized sinusoidal wave. For example, other systems may be developed for a further reduction of transformer weight. FIG. 6a is a schematic of an embodiment which illustrates such an alternative.

As shown in FIG. 6a, winding 66 of transformer 60 is connected to the line which provides the main fundamental waveform (phase A) from the main inverter circuit 10. Accordingly, the fundamental wave, as shown in FIG. 4a is impressed across winding 66. Similarly, the main fundamental waveform for phase B and phase C are impressed across windings 70 and 74 of transformers 62 and 64, respectively. The fundamental wave adds to or subtracts from the notch voltages which are developed across windings 59, 61 and 63, and which are created by the appropriate switching sequence of S15 through S20. The switching sequence of S15 through S20 is shown in FIG. 6b. By the appropriate tap selection of transformers 60, 62 and 64, a wide range of voltage ratios of $V_A$ to $V_B$ are available wherein $V_A$ is the voltage across transformer windings 59, 61 and 63, and $V_B$ is the voltage across windings 68, 72 and 78. Minimum transformer weight may be achieved while minimizing the first through the eleventh harmonics if the tap is placed such that $V_A$ equals $4V_B$. This result is obtained because the switching sequence of S15 through S20 permits $V_A$ to exist for a period of four times the length of $V_B$.

Transformers 60, 62 and 64 provide two functions. Winding 59 provides the addition of notched waveforms for each phase, as discussed above, while winding 68 provides the triplex wave resulting from summing the notches of all three phases. It should be noted that windings 68, 72 and 78 of transformers 60, 62 and 64 are combined in series in a manner similar to that discussed earlier to effect the triplex waveform.

The resulting waveform for phase A developed by the inverter having an auxiliary circuit of the type shown in FIG. 6a is depicted in FIG. 7. The resultant waveform is applied through a filter (not shown) to provide a smooth sinusoidal shape. To maintain the low level of harmonics, the voltages which comprise the sine wave having the amplitude of K volts are: fundamental wave equals 0.74 times K; $V_A$ equals 0.089 times K; $V_B$ equals 0.354 times K; and the triplex equals 0.126 times K.

I claim:

1. An inverter circuit for generating a synthesized sinusoidal output of a desired frequency comprising:
   means for generating a first, a second and a third fundamental rectangular waveform at a desired frequency wherein each of the first, the second and the third rectangular waveforms is out of phase with the other two by 120°;
   means for generating notched rectangular waveforms for each of the first, the second and the third fundamental waveforms;
   a first means for combining the notched rectangular waveforms for each of the first, the second and the third fundamental waveforms to provide a single rectangular triplex waveform having a frequency equal to three times the frequency of the desired frequency; and
   a second means for combining the first fundamental rectangular waveform, the notched rectangular waveforms for the first fundamental waveform and the single triplex waveform to provide the synthesized sinusoidal output in phase with the first fundamental waveform.

2. The inverter circuit as claimed in claim 1 further including:
   a third means for combining the second fundamental rectangular waveform, the notched waveform for the second fundamental waveform and the single triplex waveform to provide the synthesized sinusoidal output in phase with the second fundamental waveform.

3. The inverter circuit as claimed in claim 2 further including:
   a fourth means for combining the third fundamental rectangular waveform, the notched waveform for the third fundamental waveform and the single triplex waveform to provide synthesized sinusoidal output in phase with the third fundamental waveform.

4. The inverter circuit as claimed in claim 1 wherein: the first means for combining the notched waveforms combine four notched waveforms for every period of the single triplex waveform.

5. The inverter circuit as claimed in claim 1 wherein the means for generating notched rectangular waveforms for each of the first, the second and the third fundamental waveforms provide notched waveforms intermittently for 30° intervals of the fundamental waveforms.

6. The inverter circuit as claimed in claim 1 wherein means for filtering the synthesized sinusoidal output are coupled to the second means for combining to provide a filtered sinusoidal output having an amplitude of K volts.

7. The inverter circuit as claimed in claim 6 wherein the first, the second and the third fundamental rectangular waveforms have an amplitude of 0.827 times K volts, and the notched rectangular waveforms have an amplitude of 0.443 times K volts and the single triplex waveform has an amplitude of 0.128 times K volts.

8. The inverter circuit as claimed in claim 1 wherein the means for generating notched rectangular waveforms for each of the first, the second and the third fundamental waveforms provide the notched rectangular waveforms at a frequency less than the single triplex waveform.

9. The inverter circuit as claimed in claim 6 wherein the first, the second and the third fundamental rectangular waveforms have an amplitude of 0.74 times K volts, the notched rectangular waveforms have an amplitude of 0.42 times K volts but having a maximum positive amplitude of 0.084 times K volts and a maximum negative amplitude of 0.34 (0.084 × 4) times K volts, and the single triplex waveform has an amplitude of 0.126 times K volts.

10. An inverter circuit for generating synthesized sinusoidal outputs of a desired frequency comprising:
   means for generating a first, a second and a third fundamental rectangular waveform at a desired frequency wherein each of the first, the second and the third rectangular waveforms is out of phase with the other two by 120°;
   means for generating notched rectangular waveforms for each of the first, the second and the third fundamental waveforms;
   a first means for combining the notched rectangular waveforms for each of the first, the second and the third fundamental waveforms to provide a single rectangular triplex waveform having a frequency equal to three times the frequency of the desired frequency;
   a second means for combining the first fundamental rectangular waveform, the notched rectangular waveform for the first fundamental waveform and the single triplex waveform to provide the synthesized sinusoidal output in phase with the first fundamental waveform;
   a third means for combining the second fundamental rectangular waveform, the notched rectangular waveform for the second fundamental waveform and the single triplex waveform to provide the synthesized sinusoidal output in phase with the second fundamental waveform;
   a fourth means for combining the third fundamental rectangular waveform, the notched rectangular waveform for the third fundamental waveform and the single triplex waveform to provide synthesized sinusoidal output in phase with the third fundamental waveform; and
   means for filtering the synthesized sinusoidal outputs coupled to the second, third and fourth combining means to provide filtered sinusoidal outputs wherein each filtered sinusoidal output has an amplitude of K volts.

11. The inverter circuit as claimed in claim 10 wherein the first, the second and the third fundamental rectangular waveforms have an amplitude of 0.827 times K volts, and the notched rectangular waveforms have an amplitude of 0.443 times K volts, and the single triplex wave has an amplitude of 0.128 times K volts.

12. The inverter circuit as claimed in claim 10 wherein the first, the second and the third fundamental rectangular waveforms have an amplitude of 0.74 times K volts, the notched rectangulr waveforms have an amplitude of 0.42 times K volts but having a maximum positive amplitude of 0.084 times K volts and a maximum negative amplitude of 0.34 (0.084 × 4) times K volts, and the single triplex waveform has an amplitude of 0.126 times K volts.

* * * * *